March 30, 1926. 1,578,699
R. W. AMMONS
LEAF SPRING LUBRICATOR
Filed Nov. 19, 1924
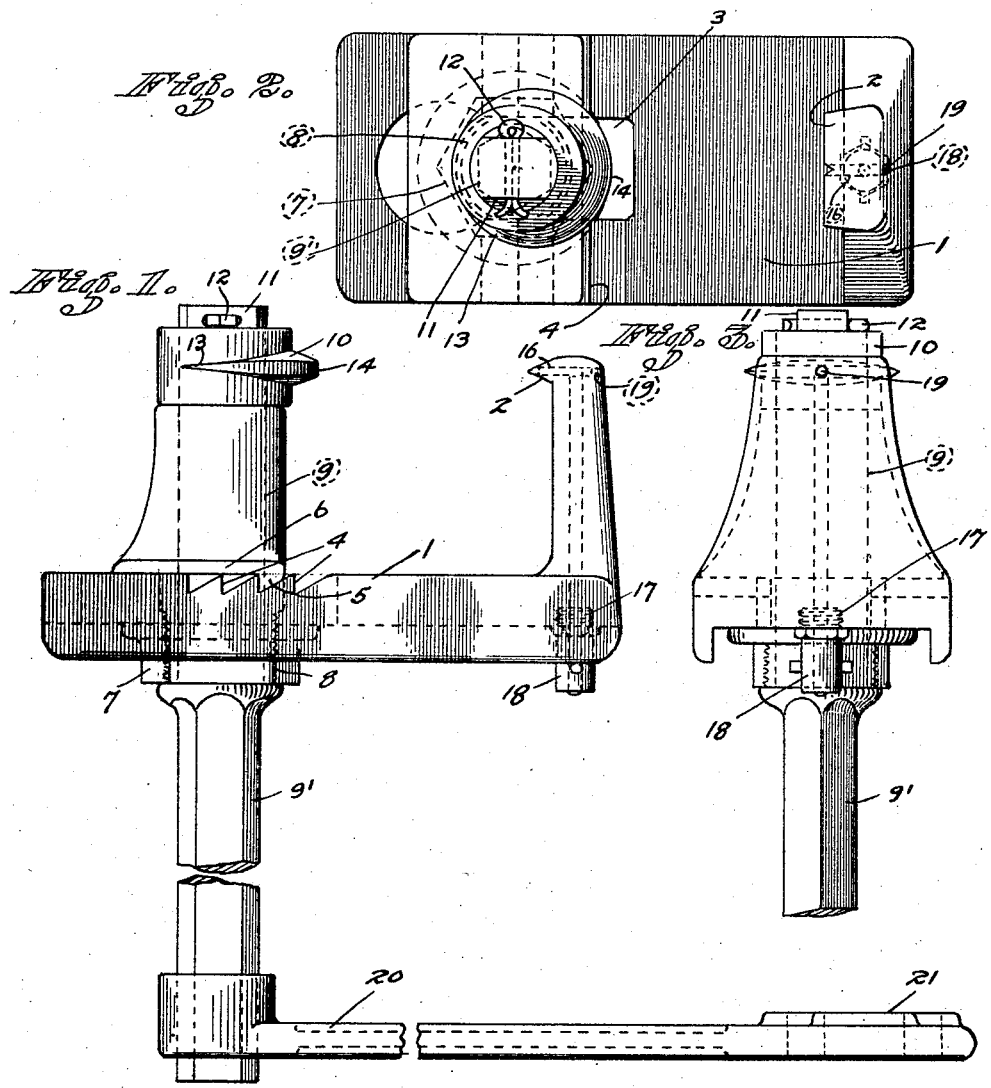
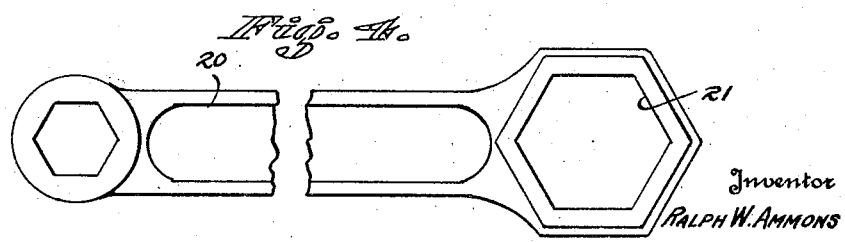

UNITED STATES PATENT OFFICE.

RALPH W. AMMONS, OF LOS ANGELES, CALIFORNIA.

LEAF-SPRING LUBRICATOR.

Application filed November 19, 1924. Serial No. 750,910.

*To all whom it may concern:*

Be it known that I, RALPH W. AMMONS, a citizen of the United States, and a resident of Los Angeles, county of Los Angeles, State of California, have invented a new and useful Leaf-Spring Lubricator, of which the following is a specification.

This invention relates to devices for lubricating leaf springs of automobiles and other vehicles.

The principal objects of my invention are to provide means for easily and quickly spreading the leaves of the springs, and means for injecting oil or grease into the space between the leaves. Also, a device which may be brought from an inoperative to an operative position with a single movement of a lever, and a device which may be quickly adjusted to suit all sizes of springs and which will be adjustable in its operation so as to avoid interference with the varied construction of modern automobiles adjacent the springs, and all the above in a device which will be simple and easy to manufacture.

I attain the objects outlined in the device shown in the accompanying drawings, and in which:

Figure 1 is an elevation of my device and which may be considered as shown approximately full size for one size of my device, but which is made in a variety of sizes;

Figure 2 is a plan view of the upper part of Figure 1;

Figure 3 is an end view of the upper part of Figure 1;

Figure 4 is a plan view of the lever handle of my device.

Essentially my invention consists of a levered device for forcing apart the leaves of a leaf spring, and a lubricating nozzle arranged for injection of grease in the space.

The device takes the form of an L-shaped bracket 1 having a wedge shaped spreading jaw 2 extending from the end of the short leg and directed parallel to the long leg of the L.

The long leg is slotted at 3 and has ratchet notches 4 formed along both sides of the slot to selectively engage the teeth 5 of a bearing portion 6 adjustable along the slot into the various notches and locked in place by a nut 7 bearing against the under side of the bracket and threadedly engaging an extension 8 from the bearing portion whereby the bearing portion may be drawn tightly against the upper side of the bracket.

An operating shaft 9 is revolvably supported in the bearing portion and carries at its upper end a cam disk spring spreader 10.

The spreader 10 is a disk eccentrically secured to the end of the shaft, either by riveting it to a squared or flattened end of the shaft or by holding it on such a squared end 11 by means of a cotter pin 12 as indicated.

The edge of the spreader disk is sharpened at the portion of least extension 13 and gradually flattened at the point of greater throw 14 and the disk is aligned with the fixed spreading wedge 2, thus presenting in use a rotary wedge for forcing the springs apart upon turning the shaft 9 about a half revolution, the thick edge 14 moving from the dotted position at the left to the full line position at the right as indicated in Figure 2.

The vehicle spring would take a position between the jaw 2 and the spreader disk 10 and in order to introduce grease or oil into the space between the leaves of the spring after spreading apart, a hole 16 extends through the jaw 2—coming out at the lower side of the bracket where it is either simply threaded as shown at 17, or provided with a standard pressure lubricator connection 18.

In forming this hole to come out at the under side of the bracket, it would ordinarily be drilled at right angles and the portion 19 plugged as indicated.

The operating shaft 9 extends a considerable distance below the bracket at the side opposite from which the spreading devices are located and is preferably of hexagon form 9' throughout the exposed portion so as to provide for the engagement of a socket wrench handle 20 at any point along the shaft, while the other end of the handle has a wrench socket 21 to fit the nut 7 for adjusting the bearing portion in the slot.

The provision of a long extension operating shaft under the bracket as well as the provision so that the wrench handle may be slid to any point along the shaft, is one of the most important features of my invention, for the spring suspension varies so much in different automobiles that a device which cannot be operated from underneath, or in which the handle is fixed will often be found useless on account of interfering frame constructions, brake rods, braces and other features, whereas with my device the operating shaft extends vertically down one side of the spring and the handle may be slid along it to dodge any constructional feature of the particular automobile being worked upon.

Another feature of importance is the termination of the oil hole or grease gun connection 18 under the bracket for this keeps the grease line within the bracket width so it will not be broken by interfering parts mentioned and also provides for much more convenient operation of greasing devices attached to the opening.

In use, my device is placed over the spring and the lever given a half turn and a shot of grease injected through the nipple with any form of gun. If the gun has a flexible tube it may be left connected to the nipple in changing from one leaf to another.

Having thus described my invention and its mode of use,

I claim:

1. A leaf spring spreader comprising a bracket, a wedge jaw projecting from one side of the bracket, a shaft extending entirely through the bracket and revolvably supported thereon while projecting from both sides thereof, a spreader disk eccentrically secured to the shaft on the jaw side of the bracket adapted to cooperate with the jaw for spreading a leaf spring, the extension of the shaft on the other side of the bracket being accessible for revolving the spreader disk.

2. A leaf spring spreader comprising a bracket, a wedge jaw projecting from one side of the bracket, a shaft extending through the bracket and revolvably supported thereon, a spreader disk eccentrically secured to the shaft on the jaw side of the bracket adapted to cooperate with the jaw for spreading a leaf spring, the extension of the shaft on the other side of the bracket being accessible for revolving the spreader disk and having a wrench engaging portion formed therealong.

3. A leaf spring spreader comprising an L-shaped bracket having a spring prying wedge on the short arm and a slot in the long arm, a bearing member adjustable along the slot and provided with a nut for clamping it to the long arm, a shaft extending through the bearing member and slot, a circular wedge secured to the end of the shaft aligned with the said wedge for prying a spring upon turning the shaft, and a wrench handle for the shaft having a portion adapted to engage the shaft extension for turning it and also a portion adapted to engage the said nut for turning it.

RALPH W. AMMONS.